Oct. 21, 1969    M. J. A. BATES    3,473,701
DISPENSER UNIT
Filed Oct. 24, 1965    2 Sheets-Sheet 1

Mary Jo Ann Bates INVENTOR.
BY
Marcus L Bates

Oct. 21, 1969    M. J. A. BATES    3,473,701

DISPENSER UNIT

Filed Oct. 24, 1965    2 Sheets-Sheet 2

Mary Jo Ann Bates INVENTOR.

BY Marcus S Bates

United States Patent Office 3,473,701
Patented Oct. 21, 1969

3,473,701
DISPENSER UNIT
Mary Jo Ann Bates, P.O. Box 4013,
Odessa, Tex. 79762
Filed Oct. 24, 1965, Ser. No. 504,745
Int. Cl. B67d 5/58; B01d 23/00; G01f 11/26
U.S. Cl. 222—189                    7 Claims

ABSTRACT OF THE DISCLOSURE

A dispenser for use in combination with a jar and a lid, for straining food products, such as olives and the like, from the solution in which they are suspended. The dispenser includes a basket suspended from a gasket, with apertures arranged with respect to the basket whereby the jar may be inverted to cause the olives to flow into the basket, so that when the jar is again uprighted, the olives remain trapped in the basket and in close proximity to the lid. Removal of the lid enables one to retrieve the olives from the basket by merely reaching through the gasket with the fingers to obtain the olives which are located in close proximity to the top of the jar.

---

This invention relates to a novel dispenser combination that may be used in conjunction with a jar and lid therefor. For the purpose of illustration, the present invention is shown associated with a jar of olives.

Olives normally are packed in a pickling solution, and generally marketed in a cylindrical jar which contains a screw type lid thereon. When a new jar of olives is first opened, the olives arranged on the top layer are readily accessible; but, as the olives are used, they become increasingly difficult to remove from their container, as is well known to anyone who has attempted to remove the last few olives from a large jar. In fact, olives and their relationship to an olive jar is often the subject of many a humorous anecdote.

One of the objects of this invention is to provide an apparatus that enables the removal of olives and the like from a container.

Another object of this invention is to provide a means by which olives are strained from their pickling juices or fluid medium, while simultaneously making the olives easily available to the user thereof.

A further object of this invention is to provide a container gasket and a dispenser-strainer combination.

Other objects of the invention and the various advantages and characteristics of the present dispenser, strainer, and gasket will be apparent from a consideration of the following detailed description, and especially by the novel features which are hereinafter set forth and particularly defined by the claims at the conclusion thereof.

FIGURE 10A shows the partially filled jar with the dispenser being unfilled.

FIGURE 10B shows the jar inverted and filling the dispenser with olives.

FIGURE 10C shows the jar in upright position after filling the dispenser with olives.

FIGURE 10D shows the jar in upright position with the lid removed and the olives entrapped in the top, readily accessible to the user thereof.

Figure 9:
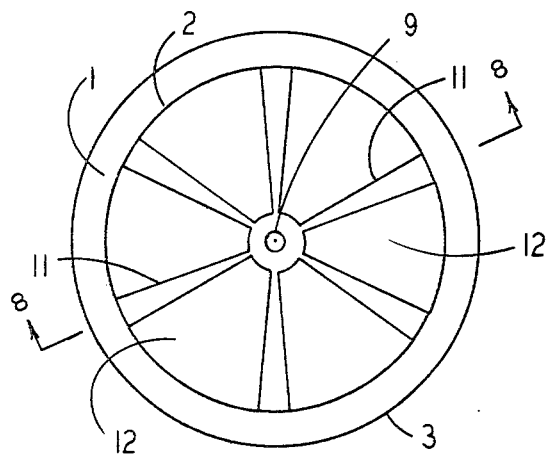
FIGURE 9 is a top view of the modification of FIGURE 8.
Figure 10:
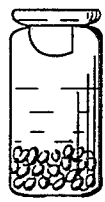
FIGURE 10 shows diagrammatically and in four stages of operation a jar of olives with one of the dispensing devices operatively associated with the lid and jar.
Figure 10:
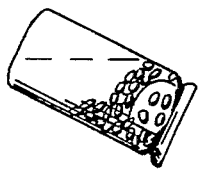
Figure 10:
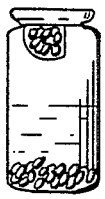
Figure 10:

Referring now to FIGURES 10 A B C D in conjunction with FIGURES 1 through 9 of the drawings, wherein identical numbers are used throughout to denote substantially identical structure, there is disclosed a dispenser in operative relationship to a jar of olives. When the jar, lid, and dispenser are properly assembled (i.e., a jar of olives having a lid affixed thereto with the dispenser operatively fitted therebetween with the gasket 1 seating on the jar top) and one desires a few olives, the entire assembly is momentarily inverted to the position shown in FIGURE 10B, and then returned to its normal or upright position FIGURE 10C. The olives, upon the jar being inverted, will flow or tumble into the dispenser where they will remain or be entrapped when the jar is returned to its upright position. Normally, by the time the lid is removed, the liquid will have substantially drained from the olives through the drain holes. Removal of the lid allows access to the drained olives caught in the dispenser. Hence, the age old job of fishing, spearing, dipping, probing, or sticking an olive is obviated by the instant novel olive dispenser.

Figures 1, 2:
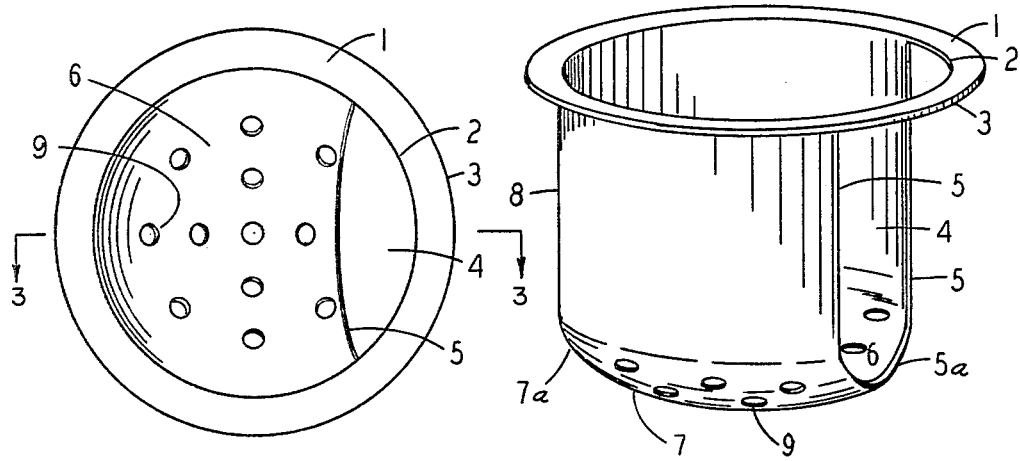
FIGURE 1 is a perspective view showing the dispenser, strainer, and gasket combination.
FIGURE 2 is a top view of the device of FIGURE 1.
Figures 3, 4:
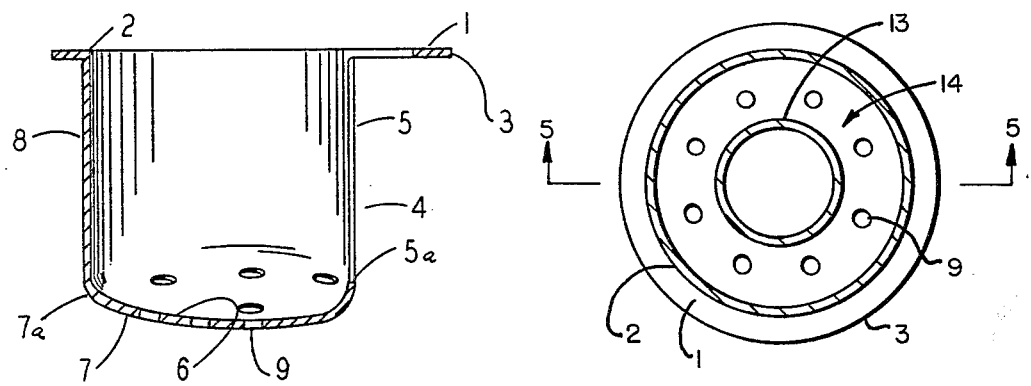
FIGURE 3 is a sectional view taken along line 3—3 of FIGURE 2.
FIGURE 4 is a sectional view of a modification of the device of FIGURE 1, taken along line 4—4 of FIGURE 5.

Referring now in particular to the embodiment illustrated by FIGURES 1, 2, and 3, there is seen a dispenser having a basket formed by side wall 8 and bottom 7. Numeral 9 indicates drain holes and 4 the side entrance bounded or formed by wall edges 5. Numeral 6 generally indicates the inside bottom of the basket. The top of the basket is peripherally surrounded by horizontally disposed gasket 1 which is integrally formed to the top of the basket, as indicated at numeral 2. The outer edge 3 of the gasket is larger than the outside diameter of the basket in order to provide a gasket as well as a support member for the basket. The gasket 1 also develops greater rigidity in the basket since the inside edge 2 of the gasket also forms the top opening of the basket.

The entrance 4 includes a bottom edge 5a as seen in FIGURE 3, which has been turned upward to form a vertical wall to facilitate holding the olives in the basket.

The bottom of the basket 6 and 7 may be horizontal, or sloped towards 7a, FIGURES 1 and 3, if desired. Good results have also been found with a basket that is both cup shaped and sloped as in FIGURE 1, since this permits greater entrapment of the olives than a horizontal flat bottom.

Figures 5, 6:
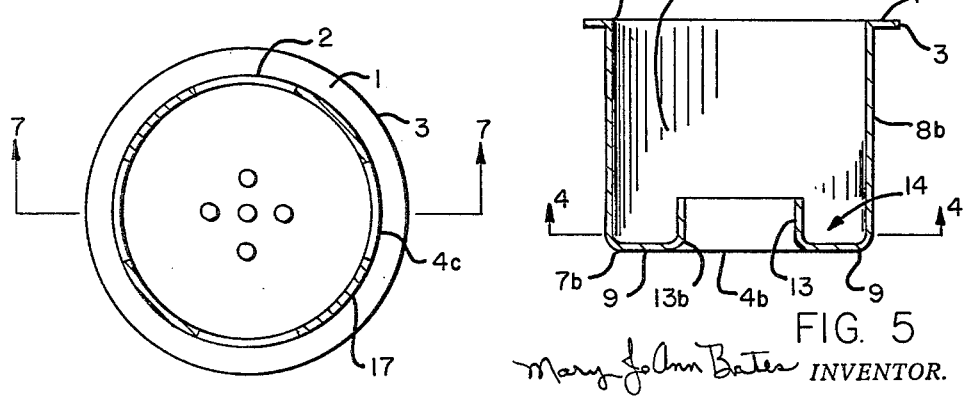
FIGURE 5 is a sectional view taken along line 5—5 of FIGURE 4.
FIGURE 6 is a top sectional view of still a further modification of FIGURE 1 taken along line 6—6 of FIGURE 7.

Referring now to the modification of FIGURES 4 and 5, there is seen illustrated therein a tubular element 13 integrally attached about periphery 13b to the basket bottom 7b. The basket bottom 7b, tubular element 13, and side wall 8b are integrally joined together in the illustrated manner to form a toroidal or doughnut-like cup, generally illustrated by the arrow at numeral 14 in which the olives are entrapped. Drain holes 9 strain off the liquid which is trapped within the basket, leaving the olives in the doughnut-like cup 14, when the dispenser is used in a manner similar to that explained in conjunction with FIGURES 1 through 3 above.

In the embodiment of FIGURES 4 and 5, the diameter of the entrance 4b must be of a size to permit the olives to freely tumble into the toroidal like basket. The width of the toroid or doughnut-like cup 14 must be at least wide enough to accommodate an olive. The height of the wall 8b may be adjusted depending upon the height of the jar and depending upon the size of each serving of olives deemed desirable. In particular, considering that the average olive requires a minimum hole diameter of approximately ¾ inch, i.e., an aperture of at least 0.44 sq. in. for free passage therethrough. It follows that the diameter of the entrance, or aperture 4b must be at least ¾ inch, the width of toroid portion 14 at least ¾ inch, and a height of wall 8b a sufficient amount to entrap at least one layer of olives. In a jar six inches in height and having an inside diameter of three inches, the following dimensions have been found to produce satisfactory results: diameter of 4b: one inch; diameter top opening formed by gasket 1: three inches; height of wall 8b: two inches; gasket 1 outside diameter: three and ⅜ inches; height of wall or tubular element 13: one inch. The thickness of the walls 8b, 13, and 7b must be taken into consideration with the above figures, but are not detailed here since such a matter is considered mere design expediency.

Figure 7:
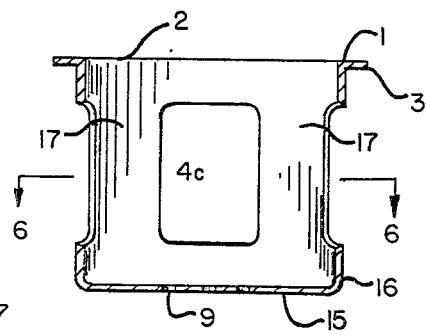
FIGURE 7 is a side sectional view taken along line 7—7 of FIGURE 6.

In the modification illustrated by the embodiment of FIGURES 6 and 7, there is seen illustrated therein a gasket 1 peripherally joined to basket 16. A bottom 15, which may be dished or curved if desired, is provided with drain holes 9. The basket 16 is provided with several entrances or holes 4 leaving lands 17 therebetween. Sectional view FIGURE 6 shows four lands 17 forming four holes 4c in the basket 16. The holes 4c are sufficiently wide (at least ¾ inch) to permit the olives to tumble into the basket when the jar is inverted, and when the jar is returned to the upright position the basket will retain most of the olives that tumble thereinto, with the liquid normally draining by gravity through drain holes 9. Removal of the jar lid will enable one to remove the olives through the top opening formed by gasket 12 at numeral 2 in a manner similar to that explained in conjunction with the several previous embodiments.

Figure 8:
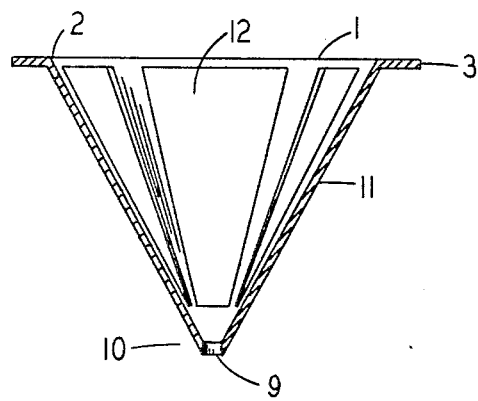
FIGURE 8 illustrates a still different modification of the device showing a side sectional view taken along line 8—8 of FIGURE 9.

In the modification illustrated by FIGURES 8 and 9, there is seen a cone shaped basket attached to gasket 1 at edge 2. The cone shaped basket is formed with an apex 10 from and about which spokes 11 radiate upwards and outwards to the gasket 1, leaving triangular shaped openings 12 separated by lands 11. A drain hole 9 is optionally provided at the apex 10.

The device of FIGURES 8 and 9 thus has a series of openings 12 through which the olives may tumble into the cone shaped basket when the jar is inverted and the lid, jar, and device are operatively assembled in a manner previously explained in conjunction with the remaining embodiments. Uprighting the jar will cause the entrapped olives to rest inside the basket, and since the openings 12 are progressively smaller towards the base or apex 10, the olives cannot tumble back into the bottom of the jar. Removal of the jar lid allows access to the entrapped olives through the opening at the top of the basket which is defined by the gasket edge 2. A drain hole 9 located at the apex of the conical basket will drain off any remaining liquid in the apex that has failed to drain through the bottommost portion of openings 12.

The number of spokes or lands 11 should be arranged to provide a free area of at least a size so as to accommodate an average olive at the upper or larger portion of the triangle 12, and should be of a size or area at the lower part of the triangle to prevent the passage therethrough of an average size olive.

The entire device of FIGURES 8 and 9 is preferably unitized or integrally fabricated into a single body. The device may be fabricated from material that is either plastic or metal. Plastic is deemed more suitable than metal because of its inert properties in acetic solutions.

As will now be obvious after a careful study of the above descriptions and drawings, the novel dispenser set forth in the following claims enables one to remove pickled olives from a jar in a manner heretofore unknown.

The apparatus embraced and described in the above specification obviously may be used for separating other material from a container, such as pickled onions, beets, small pickles, nuts, marbles, screws, and the like. For this reason I do not wish to be limited in the use of my device by the above specifications and drawing, since the above description is merely an illustration of one use of my device.

I claim:

1. A container having an upwardly opening top with a closure means adapted to be attached to the top, and liquid having a food product, such as olives or the like, suspended therein, with the liquid and product capable of being located within the container; in combination:

a dispenser having a wall defining a basket, said basket having an upper terminal end and a lower end portion;

said upper terminal end having an outwardly directed gasket integrally attached thereto with said gasket having an inside edge portion defining an opening into said basket; said gasket adapted to be received and held between the upper terminal end of the container top and the closure means;

said lower end portion of said basket including means forming a drain comprised of an apertured bottom with the aperture being smaller than the average size of the food product; said bottom being spaced apart from the lower extremity of the container;

means forming a multiplicity of entrances through the sides of said basket for receiving liquid and food product therethrough when said container is inverted;

said basket being spaced apart from the inside peripheral surface of the container a sufficient distance to enable food products to flow therebetween and through said entrances into said basket;

said basket being in the form of an inverted cone with said lower end portion being spaced apart from said gasket and from which there extends upwardly directed lands radiating from said lower end portion and integrally attached to the inside edge portion of said gasket; said entrances being spaced apart and defined by said lands and having a sufficiently large free area near the gasket to permit the liquid and food products to flow therethrough and having a sufficiently small free area near the aperture to prevent flow of food product therethrough.

2. The combination of claim 1 wherein said lands form an integral part of said gasket and said bottom.

3. In combination with a container, the container having an upwardly opening top with a closure means adapted to be affixed adjacent to the upper terminal end of the top, and said container adapted to receive a liquid having individual bodies contained therewithin; the improvement comprising:

a dispenser having a side wall defining a basket with said basket having an upper terminal end and a lower end portion;

said upper terminal end having an outwardly directed gasket integrally attached thereto; said gasket being received and held between the upper terminal end of the container top and the closure means;

said lower end portion including a perforated bottom wherein the perforations are smaller than the average size of the individual bodies;

means forming an entrance into said basket for receiving the liquid and individual bodies therethrough when the container is inverted;

said entrance including an upwardly depending tubular element integrally attached to the central portion of said perforated bottom, said tubular element and said basket having a common central axis, and said tubular element, said perforated bottom and said basket forming a doughnut-like cup; said doughnut-like cup being of sufficient width between the tubular element and the sides of the basket to catch the bodies therebetween;

said perforated bottom providing drain holes located between said tubular element and the sides of said basket; whereby the bodies may be trapped in said doughnut-like cup.

4. In combination with a container, the container having an upwardly opening top with a closure means adapted to be attached adjacent to the upper terminal end of the top, and said container adapted to receive liquid therewithin with the liquid having individual bodies suspended therewithin; the improvement comprising:

a dispenser having a side wall defining a basket with said basket having an upper terminal end and a lower end portion; said upper terminal end having an outwardly directed gasket integrally attached thereto; said gasket adapted to be received and held between the upper terminal end of the container top and the closure means;

said lower end portion being spaced apart from said gasket and including a perforated bottom wherein the perforations are smaller than the average size of the individual bodies; said perforated bottom being spaced apart from said gasket;

means forming a multiplicity of spaced apart entrances through the sides of said basket for receiving the liquid and individual bodies therethrough when the container is inverted; each of said entrances having an upper, side, and lower edge portion defined by said basket sides, with the uppermost edge portion being spaced apart from said gasket, and with the lowermost edge portion being spaced apart from said perforated bottom;

said basket adapted to be telescopingly received within the container with the sides thereof being spaced apart from the inside peripheral wall surface of the container sufficiently to allow liquid and individual bodies to be received through the entrances when the container is inverted, and there being sufficient space between the lowermost edges of the entrances and the perforated bottom to allow said bodies to be trapped in the basket when the container is returned to upright position, while liquid drains from the basket through the perforated bottom.

5. The improvement of claim 4 wherein said entrances are radially spaced apart and concentrically arranged with respect to said gasket.

6. In a container having an upwardly opening top with a closure means adapted to be secured adjacent to the upper terminal end of the top, said container adapted to receive a liquid having a food product, such as olives or the like, suspended therein; in combination; a dispenser adapted to retain and strain the product from the liquid; said dispenser including a basket and an outwardly directed gasket integrally attached to the upper terminal end of said basket; said gasket having an outside edge portion and an inside edge portion and being adapted to be received and held between the upper terminal end of the container top and the closure means;

said basket having a side wall and a bottom; means forming an entrance in said side wall with said entrance being sufficiently large to enable food product and liquid to flow therethrough when the container is inverted; said bottom having means forming at least one drain hole therein with said at least one drain hole being sufficiently small in size to preclude flow of food product therethrough;

said side wall having an upper end integrally attached to the inside edge portion of said gasket, said side wall having a lower end integrally attached to said bottom; with said side entrance being located between said gasket and said bottom, and with said bottom being spaced apart from said gasket;

said side entrance being so located with respect to the basket bottom to allow food products to be trapped within the basket;

said side wall being spaced apart from the inside wall surface of the container a sufficient distance to enable food products to flow through said side entrance and into said basket; whereby:

inverting the container allows liquid and product to flow through said side entrance and into the dispenser, uprighting the container allows liquid to flow through said at least one drain hole while entrapping the product therein, and removal of the closure means enables retrieval of the product through said gasket.

7. The dispenser of claim 6 wherein said side entrance has an edge portion defined by said side wall, bottom, and the inside surface of said gasket.

References Cited

UNITED STATES PATENTS

| 387,236 | 8/1888 | Knowlton | 210—470 |
| 540,852 | 6/1895 | Cheney | 210—474 X |
| 1,111,249 | 9/1914 | Courtwright | 210—474 |
| 2,038,418 | 4/1936 | Conner | 222—454 X |
| 2,760,693 | 8/1956 | Mika | 222—454 |
| 3,269,545 | 8/1966 | Udell | 210—474 X |
| 3,380,592 | 4/1968 | Arnold | 210—470 X |

FOREIGN PATENTS

| 453,695 | 6/1913 | France. |
| 464,581 | 4/1937 | Great Britain. |

REUBEN FRIEDMAN, Primary Examiner

W. S. BRADBURY, Assistant Examiner

U.S. Cl. X.R.

210—474, 477; 222—454